US012680595B2

(12) United States Patent
Gazzaneo et al.

(10) Patent No.: US 12,680,595 B2
(45) Date of Patent: Jul. 14, 2026

(54) POWER TRANSMISSION BELT AND RELATED TRANSMISSION SYSTEM

(71) Applicant: DAYCO EUROPE S.R.L., Chieti (IT)

(72) Inventors: Giuseppe Gazzaneo, Chieti (IT); Fabio Nardone, Chieti (IT); Arcangelo Di Carlo, Chieti (IT); Marco Di Meco, Chieti (IT)

(73) Assignee: DAYCO EUROPE S.R.L., Chieti (IT)

(*) Notice: Subject to any disclaimer, the term of this patent is extended or adjusted under 35 U.S.C. 154(b) by 0 days.

(21) Appl. No.: 18/850,687

(22) PCT Filed: Mar. 21, 2023

(86) PCT No.: PCT/IB2023/052767
§ 371 (c)(1),
(2) Date: Sep. 25, 2024

(87) PCT Pub. No.: WO2023/180929
PCT Pub. Date: Sep. 28, 2023

(65) Prior Publication Data

US 2025/0224017 A1 Jul. 10, 2025

(30) Foreign Application Priority Data

Mar. 25, 2022 (IT) ........................ 102022000005975

(51) Int. Cl.
*F16G 1/21* (2006.01)
*D03D 15/283* (2021.01)
(Continued)

(52) U.S. Cl.
CPC ............. *F16G 1/21* (2013.01); *D03D 15/283* (2021.01); *D03D 15/513* (2021.01); *D03D 15/56* (2021.01);
(Continued)

(58) Field of Classification Search
CPC ........... F16G 1/28; F16G 1/21; D03D 15/283; D03D 15/513; D03D 15/56; D03D 15/573;
(Continued)

(56) References Cited

U.S. PATENT DOCUMENTS 9,927,001 B2 * 3/2018 Di Meco ............. F16H 57/0489
10,018,247 B2 * 7/2018 Wu ........................ D03D 15/47
(Continued)

FOREIGN PATENT DOCUMENTS

JP 2011099457 A 5/2011

OTHER PUBLICATIONS

International Search Report and Written Opinion, Application No. PCT/IB2023/052767, Jun. 13, 2023, p. 1-10.

*Primary Examiner* — Henry Y Liu
(74) *Attorney, Agent, or Firm* — FisherBroyles, LLP; Susan M. Oiler

(57) ABSTRACT

Power transmission belts are disclosed that have a body made of a first elastomeric material, a plurality of cords embedded in the body of the belt, a back and a plurality of ribs or teeth. The back, ribs, or the teeth are covered by a covering material of woven fabric, knitted fabric, and non-woven fabric, which is treated with a treatment composition that includes polyurethane, polytetrafluoroethylene, and polycarbodiimide.

18 Claims, 2 Drawing Sheets

(51) Int. Cl.

| | |
|---|---|
| ***D03D 15/513*** | (2021.01) |
| ***D03D 15/56*** | (2021.01) |
| ***D03D 15/573*** | (2021.01) |
| ***D04B 21/00*** | (2006.01) |
| ***D06M 15/256*** | (2006.01) |
| ***D06M 15/564*** | (2006.01) |
| ***D06M 15/59*** | (2006.01) |
| ***D06M 101/06*** | (2006.01) |
| ***D06M 101/32*** | (2006.01) |
| ***D06M 101/36*** | (2006.01) |
| ***D06M 101/38*** | (2006.01) |
| ***F16G 1/28*** | (2006.01) |

(52) U.S. Cl.

CPC ........... *D03D 15/573* (2021.01); *D04B 21/00* (2013.01); *D06M 15/256* (2013.01); *D06M 15/564* (2013.01); *D06M 15/59* (2013.01); *F16G 1/28* (2013.01); *D06M 2101/06* (2013.01); *D06M 2101/32* (2013.01); *D06M 2101/36* (2013.01); *D06M 2101/38* (2013.01); *D10B 2201/02* (2013.01); *D10B 2331/021* (2013.01); *D10B 2331/04* (2013.01); *D10B 2401/04* (2013.01); *D10B 2401/061* (2013.01); *D10B 2401/063* (2013.01); *D10B 2505/00* (2013.01)

(58) Field of Classification Search

CPC .. D04B 21/00; D06M 15/256; D06M 15/564; D06M 15/59; D06M 2101/06; D06M 2101/32; D06M 2101/36; D06M 2101/38; D10B 2201/02; D10B 2331/021

See application file for complete search history.

(56) References Cited

U.S. PATENT DOCUMENTS

| | | | | |
|---|---|---|---|---|
| 10,018,248 | B2 * | 7/2018 | Duke, Jr. | F16G 1/16 |
| 10,041,564 | B2 * | 8/2018 | Casagrande | F16G 5/04 |
| 11,168,759 | B2 * | 11/2021 | Wu | D03D 1/0094 |
| 11,480,231 | B2 * | 10/2022 | Parziale | F16H 57/0489 |
| 12,331,211 | B2 * | 6/2025 | Ozaki | D06M 15/55 |
| 2010/0004082 | A1 * | 1/2010 | Di Meco | F16G 1/28<br>474/205 |
| 2011/0003659 | A1 * | 1/2011 | Wu | D03D 15/283<br>474/268 |
| 2017/0030431 | A1 * | 2/2017 | Duke, Jr. | F16G 1/04 |
| 2017/0045117 | A1 * | 2/2017 | Casagrande | F16G 5/20 |
| 2017/0082174 | A1 * | 3/2017 | Parziale | F16H 57/0489 |
| 2018/0313028 | A1 * | 11/2018 | Tomoda | D06M 15/693 |
| 2019/0169349 | A1 * | 6/2019 | Arimachi | F16G 1/28 |
| 2019/0376579 | A1 * | 12/2019 | Wu | D03D 1/0094 |
| 2020/0378470 | A1 * | 12/2020 | Parziale | F16H 7/023 |
| 2022/0267634 | A1 * | 8/2022 | Ozaki | C09D 123/16 |

* cited by examiner

POWER TRANSMISSION BELT AND RELATED TRANSMISSION SYSTEM

CROSS-REFERENCE TO RELATED APPLICATIONS

The present invention is filed under 35 U.S.C. § 371 as the U.S. National Phase of International Patent Application No. PCT/IB2023/052767, filed Mar. 21, 2023, which designated the United States and which claims the benefit of Italian Patent Application No. 102022000005975, filed on Mar. 25, 2022, the entire disclosure of which is incorporated herein by reference.

TECHNICAL SECTOR

The present invention relates to a power transmission belt and, in particular, to a belt for use in power transmission systems for use in vehicles and to the related transmission system.

STATE OF THE PRIOR ART

The present invention is preferably used for the transmission of motion in a transmission assembly of a motor vehicle.

The transmission of motion in motor vehicles preferably takes place by using synchronous power transmission belts, also referred to as toothed belts.

Power transmission belts are also used in motor vehicles to drive the accessory parts of a motor, also known as multiple groove or poly-V belts, which are nowadays also used in some cases in electric vehicles. An accessory transmission generally comprises a drive pulley connected to a crankshaft of an internal combustion engine of the motor vehicle, at least a second and a third pulley connected for example to an alternator and to an accessory, for example a hydraulic pump, and a transmission belt for connecting the pulleys to each other.

Such belts generally comprise a body made of elastomeric material, preferably of EPDM for the poly-V belts and made of HNBR for the toothed belts, a plurality of threadlike resistant inserts embedded longitudinally in the body, and a coupling portion integrally connected to the body and comprising a plurality of teeth that are transverse to the sliding direction of the belts in use in the case of toothed belts or ribs along the sliding direction of the poly-V belt.

Today's motors require the transmission parts and in particular the transmission belts to be able to have an increasingly longer average lifespan while having to operate under high temperature conditions and with much higher mechanical stresses.

In order to increase the average lifespan of the transmission belt by decreasing the abrasion thereof, it is known to place a layer of a more abrasion-resistant material such as for example a fabric, a non-woven or a thermoplastic material that covers at least partially the ribs.

However, this solution does not completely solve the problems of having a long durability.

In addition, whether a fabric is used as a covering material or a continuous layer of thermoplastic material is used, both tend to be very stressed and "stretched" at the grooves and ribs during the vulcanization step. The result is that the covering material is weakened precisely at the points where the stress is greatest during use.

To solve this problem, both the fabrics used in the toothed belts and those used in the poly-V belts are preferably at least partially elastic, that is they generally comprise a plurality of threads, including at least one elastic thread that allows the entire fabric to be elastic so that the fabric can better adhere to the working surface of the belt, i.e. to the surface that meshes on the pulleys during use, as shown for example in U.S. Pat. No. 3,981,206 or, alternatively, they comprise a fabric in an elastic configuration such as knitted fabric.

It should also be noted that fabrics or any other covering materials of the working surfaces or of the back such as plastic films lead to a greater friction between the contact surface of the belt and the pulley. This increased friction, in addition to further increasing the chances of breakage, also increases the noise of the belt during operation.

Therefore, an attempt was made to use alternative technical solutions in order to simultaneously achieve high wear resistance, low noise, in particular low noise even in wet conditions, and improved adhesion of the fabric on the body.

In particular, solutions that can increase the service life of the belt are being sought.

None of the solutions on the market today therefore allows to solve all the problems of the belts at the same time and in particular it is still sought for a transmission belt that can have a controlled friction and therefore less wear, have low noise and at the same time a good adhesion and that does not present the problems caused by the use of polyurethane.

Because of these problems, there is a constant search for better performing transmission belts that allow to meet the increasingly stringent specifications imposed by car manufacturers.

SUMMARY OF THE INVENTION

Aim of the present invention is the realization of a toothed transmission or poly-V belt that solves the aforementioned problems and that in particular allows to have a longer durability.

The aforesaid aim is achieved by a belt, such as a power transmission belt, that has a covering material on one or more of the back, the ribs, or teeth thereof. The covering material is a woven fabric, knitted fabric, or non-woven fabric that has been treated with a combination of polyurethane, polytetrafluoroethylene and polycarbodiimide. The combination can also include an amine, such as a triethylamine. The polycarbodiimide is present in an amount by weight relative to the total weight of the treatment of between 0.1 and 20% calculated on the vulcanized belt. The sum of polytetrafluoroethylene and polyurethane is an amount between 0.1 and 88% by weight of the treatment calculated on the vulcanized belt. The belt can be a toothed belt or a poly-V belt.

In one embodiment, the covering material is a knitted fabric, more preferably a warp knitted fabric. The knitted fabric can include a polyamide yarn and optionally one polyester yarn or cotton yarn.

In another aspect, methods of making a belt are disclosed that include treating the covering material with a treatment of polyurethane, polytetrafluoroethylene and polycarbodiimide. The methods also include vulcanizing the power transmission belt after treating said covering material.

DESCRIPTION OF THE INVENTION

By "main elastomer" it is meant that it is present in the mixture making up the body of the belt by more than 50% by weight calculated on the total weight of all elastomers in the mixture thus excluding all the other non-elastomeric components of the belt.

By "first elastomeric material essentially consists of" it is meant that in addition to all the usual additives small percentages of other polymers or copolymers can be added to the mixture without negatively affecting the chemical compatibility between the body mixture and the other elements making up the toothed belt and therefore without leaving the scope of the present invention.

By "treatment" it is meant to refer to a composition of materials making up the treatment that comes into contact with a material to be treated to give new properties to the material to be treated.

The treatment can be carried out by spreading, painting, adhesive coating or other type of process that allows contacting the treatment with the material to be treated.

In the following, percentage always refers to a percentage by weight unless otherwise specified.

Figure 1:
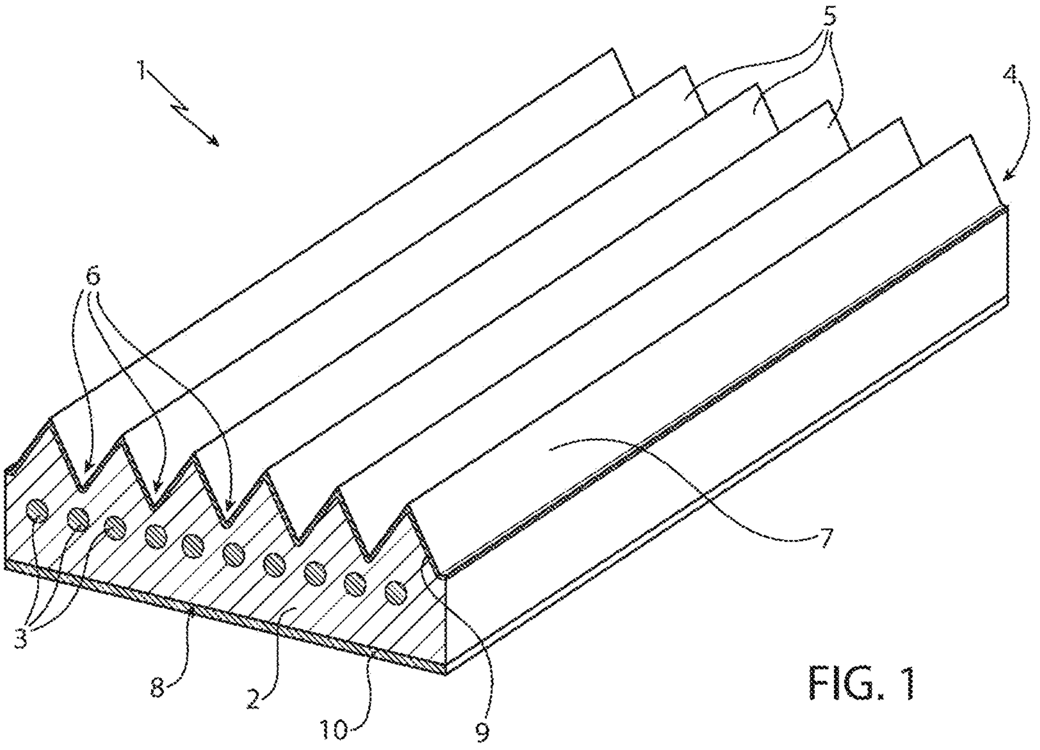
FIG. 1 is a schematic and partial view of a portion of a poly-V belt.

With reference to FIG. 1, 1 denotes a poly-V belt comprising a body 2 comprising a first elastomeric material, a plurality of threadlike resistant inserts 3 embedded longitudinally in the body, also called "cords" hereinafter and a coupling portion 4 integrally connected to the body and comprising a plurality of ribs, hereinafter also called by the name "V-shaped ribs" 5 one next to the other and alternating with V-shaped grooves 6 that form the working surface 7. The belt 1 also has a back 8 defined by the surface opposite the working surface.

Preferably, the body 2 is made of a mixture comprising one or more elastomeric materials and several additives. The elastomeric material(s) is/are referred to collectively for convenience hereinafter as the "first elastomeric material".

The body 2 of the belt advantageously comprises as main elastomer within the first elastomeric material an elastomer selected from the group consisting of natural rubber (NR), polychloroprene (CR), acrylonitrile butadiene (NBR) and related hydrogenated elastomers known as hydrogenated acrylonitrile butadiene (HNBR) or zinc salts of hydrogenated acrylonitrile butadiene grafted with unsaturated carboxylic acid esters, polyisoprene, styrene-butadiene rubbers, ethylene-alpha-olefin elastomers, EPDM, polyurethane, fluoroelastomers, ethylene-acrylic elastomers (AEM), bromine-butyl, chlorosulfonated polyethylene (CSM) or alkyl-chlorosulfonated, chlorinated polythene, epoxidized natural rubber, SBR, carboxylated NBR, carboxylated HNBR, ACM and mixtures of these compounds.

The body 2 preferably comprises as a first or as a further elastomeric material at least one polyolefin copolymer or a rubber containing acrylonitrile units.

More preferably, the first elastomeric material comprises an elastomer selected from the group consisting of EPM (ethylene-propylene monomer), EPDM (Ethylene-propylene-diene monomer), NBR (acrylonitrile butadiene rubber), HNBR (hydrogenated acrylonitrile butadiene rubber), ZnHNBR (acrylonitrile butadiene rubber with zinc salts), XHNBR (hydrogenated peroxide-cured acrylonitrile butadiene rubber).

In particular, among the rubbers containing acrylonitrile units, NBR, HNBR and modified HNBR are preferred, for example HNBR modified with zinc salt or ZnHBR or XHNBR. Particularly among the polyolefin copolymers, EPDM is preferred.

Even more preferably, the body 2 comprises EPDM.

Even more preferably, it consists essentially of EPDM.

Particularly preferred is the embodiment wherein the body comprises more than 60% by weight relative to the total weight of elastomer, more preferably more than 70% of EPDM.

Alternatively, the embodiment in which the body is essentially made up of EPDM is also preferred.

In addition to the elastomeric materials, the mixture of the body may comprise conventional additives such as, for example, reinforcing agents, fillers, pigments, stearic acid, accelerators, vulcanizing agents, antioxidants, activators, initiators, plasticizers, waxes, pre-vulcanization inhibitors, antidegradants, process oils, and the like.

A covering material, preferably a fabric 9, more preferably selected from the group consisting of woven fabric or non-woven fabric or knitted fabric, is generally arranged on the working surface or above the ribs.

Preferably the fabric 9 is treated with an elastomeric material. Preferably the fabric 9 is a knitted fabric.

The knitted fabric has proven to be particularly preferred when it has a so-called "warp knitted" or "jersey" construction.

The weight of the fabric 9 is preferably between 50 and 500 $g/m^2$, more preferably between 150 and 300 $g/m^2$, for example 250 $g/m^2$.

The fabric 9 is preferably formed by at least one non-elastic primary thread and one elastic secondary thread, but it may also comprise additional threads or combine one or more elastic secondary threads with multiple non-elastic primary threads.

Polymeric materials commonly used in technical textiles, such as for example aliphatic or aromatic polyamides, polyesters, polyurethane, poly-elastolefin, as well as natural-based fabrics such as cotton, possibly also in complex or mixed structures with several chemical threads wound one on top of the other, can be advantageously used as materials for the primary thread.

The use of a fabric comprising polyamide primary threads, preferably of an aliphatic polyamide such as nylon 6/6 is particularly preferred.

Preferably both in warp and in weft a fabric with dtex between 25 and 250 dtex is used, more preferably between 30 and 110 dtex.

Preferably the elongation is greater than 90% at 100 N in both directions and is greater than 50% at 20 N. The sample is raw. It is tested on a dynamometer as a sample of a 50 mm wide fabric and the distance between the two terminals of the dynamometer is 75 mm. The speed at which it is pulled is 500 mm/min.

In a preferred embodiment also the back 8 of the belt 1 is provided with a covering material, more preferably a fabric.

A fabric 10 preferably selected from the group consisting of woven fabric or non-woven fabric or knitted fabric is generally arranged on the back 8.

Preferably the fabric 10 is also a knitted fabric.

The knitted fabric 10 has proved to be particularly preferred when it has a so-called "warp knitted" or "jersey" construction.

According to a preferred aspect of the present invention the fabric 9 or the fabric 10 or the fabrics 9, 10 are contacted and then treated with a treatment comprising polyurethane (PU), polytetrafluoroethylene (PTFE) and polycarbodiimide.

Within the scope of the present invention by polycarbodiimide it is meant a polymer having as base unit what follows (repeated n times) wherein R refers to a chain of varying length to which various further substituent groups may possibly be added.

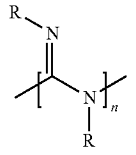

The treatment is water-based, but clearly only the solid components remain after the belt vulcanization step.

More preferably the treatment further comprises triethylamine.

Even more preferably the treatment further comprises a filler, for example carbon black.

Preferably polycarbodiimide is present in an amount between 0.1 and 20% by weight relative to the total weight of the treatment prior to contact with the belt, more preferably between 0.5 and 12% by weight.

More preferably it is present in an amount of from 1 to 5% by weight.

Polycarbodiimide is dissolved in an aqueous phase, but remains even after the belt is vulcanized into the finished product.

Preferably carbon black is present in an amount by weight between 0.5 and 10%, more preferably between 1 and 5%.

Preferably triethylamine is present in an amount by weight lower than 5%, more preferably lower than <1% and is preferably dissolved in the liquid component.

Preferably 5-chloro-2-methyl-2H-isothiazol-3-one and 2-methyl-2H-isothiazol-3-one are also present, more preferably in a 3:1 proportion). They are preferably present in amount by weight lower than 0.10%, more preferably <0.06% (dissolved in the liquid component);

Preferably the treatment also comprises 2-methylisothiazol-3(2H)-one, preferably dissolved in the liquid phase, more preferably -methylisothiazol-3(2H)-one is present in an amount lower than 0.01%.

Preferably the treatment also comprises polyurethane which remains in the solid phase even after the vulcanization of the belt and therefore on the finished product.

Preferably the treatment also comprises PTFE which remains in the solid phase even after the vulcanization of the belt and therefore on the finished product.

The solid component preferably comprises between 40 and 60% by weight of the product, more preferably between 40 and 45% by weight.

The sum by weight of PTFE (polytetrafluoroethylene) and PU (polyurethane) is preferably between 30 and 50% by weight, more preferably between 35 and 40% by weight, even more preferably between 37 and 29% by weight, for example; about 37.93%=PU+PTFE Consequently, the liquid component is preferably more than 50% by weight of the entire treatment. Water, Triethylamine and 2-methylisothiazol-3(2H)-one are preferably present in the liquid component). For example, water represents between 55 and 60% by weight of the treatment.

The treatment may for example be a Resilon® marketed by PPG-Whitford.

In particular, the treatment may be a Resilon 2241.

Preferably the treatment is added in a percentage of between 1 and 20%, more preferably between 1 and 10% by weight, even more preferably between 3 and 7% by weight relative to the total weight of the fabric.

The treatment is preferably carried out on the fabric in a step before the formation of the transmission belt.

The belt is formed at a later step and then vulcanized. In the finished belt the transmission belt comprises a fabric treated with the treatment, but the treatment does not comprise the aqueous phase and only the solid phase remains.

The solid compounds of polytetrafluoroethylene (PTFE) and polyurethane (PU) preferably comprise between 0.1 and 88% of the total weight of the treatment after vulcanization. The treatment further preferably comprises between 0.1 and 25% by weight, more preferably between 0.1 and 20% by weight, even more preferably between 0.1 and 12% by weight and a weight similar to that of the carbon black polycarbodiimide, thus preferably between 0.1 and 25% by weight, more preferably between 0.1 and 20% by weight, even more preferably between 0.1 and 12% by weight.

The pick-up of the fabric is preferably between 2 and 80 g/sq·m. and this pick-up allows to appropriately balance the characteristics conferred by the fabric from the treatment in order to optimize the durability of the belt, in particular when it is subjected to high load during use. More preferably the pick-up is between 15-50 g/sq·m., e.g. 20 g/sq·m.

For example, the dry matter may be 5%.

The transmission belt of the present invention is preferably formed according to the long-established process known as "moulding".

It has been noted that thanks to the treatment, the belt shows less wear over time and therefore performs better in durability tests.

Figure 2:
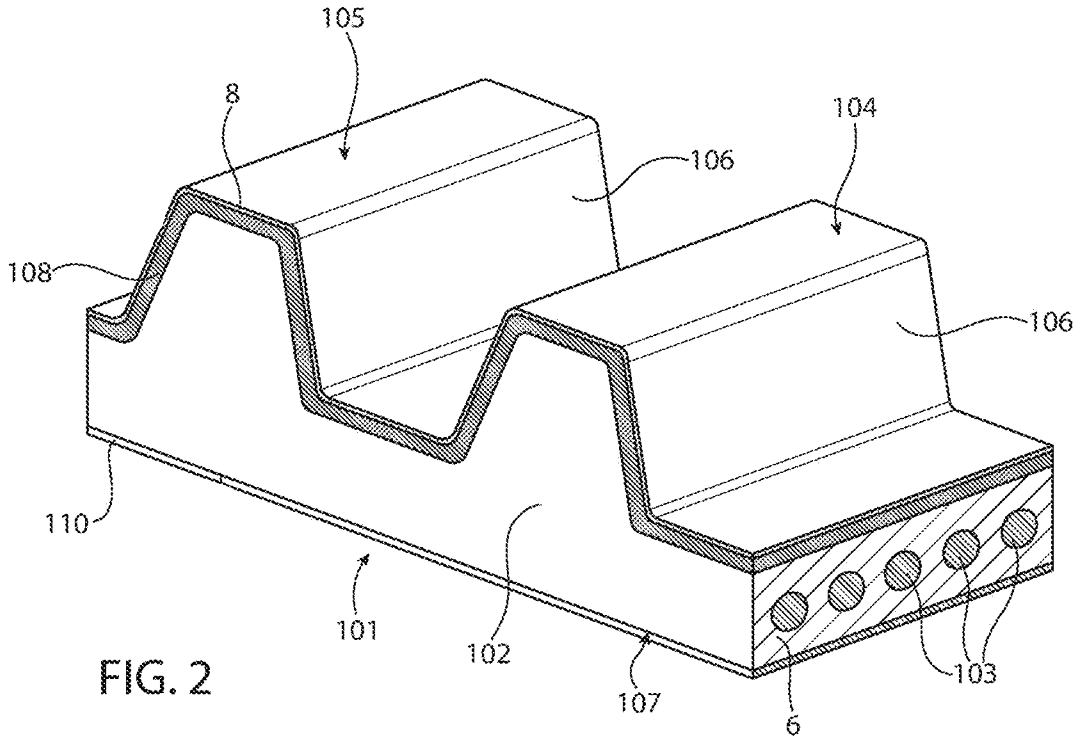
FIG. 2 is a schematic and partial view of a portion of a toothed belt.
Figure 3:
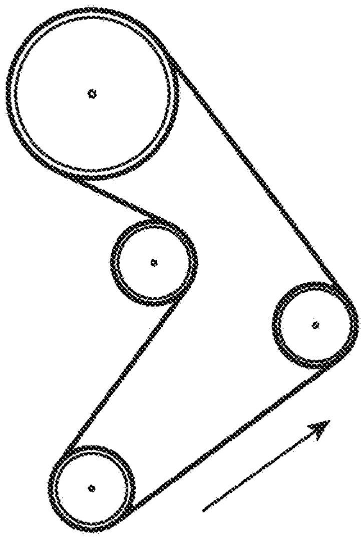
FIG. 3 is a schematic view of a transmission system for a durability test as described in the examples.

In a different embodiment of the invention in FIG. 2, 101 denotes a toothed belt as a whole. The belt 101 comprises a body 102. A plurality of longitudinally threadlike resistant inserts 103 also alternatively referred to as "cord" are embedded in the body 102.

The belt further comprises a toothing 104 composed of a plurality of teeth 106 which in use constitute the working surface 105, i.e. the surface that meshes on a corresponding pulley of the transmission system.

The toothed belt further comprises a back 107 opposite the working surface 105.

Preferably the body 102 comprises a first elastomeric mixture comprising a first main elastomeric material.

Advantageously, the pitch of the belt is between 3 mm and 20 mm, more preferably between 5 mm and 14 mm, for example 9,525 ideal for applications on vehicles.

The body 102 of the toothed belt advantageously comprises a first elastomeric material selected from the group consisting of natural rubber (NR), polychloroprene (CR), acrylonitrile butadiene (NBR) and related hydrogenated elastomers known as hydrogenated acrylonitrile butadiene (HNBR) or zinc salts of hydrogenated acrylonitrile butadiene grafted with unsaturated carboxylic acid esters, polyisoprene, styrene-butadiene rubbers, ethylene-alpha-olefin elastomers, EPDM, polyurethane, fluoroelastomers, ethylene-acrylic elastomers (AEM), bromine-butyl, chlorosulfonated polyethylene (CSM) or alkyl-chlorosulfonated, chlorinated polythene, epoxidized natural rubber, SBR, carboxylated NBR, carboxylated HNBR, ACM and mixtures of these compounds.

Advantageously, the first elastomeric material is present in the body mixture as a "main elastomer", i.e. it is present in the body mixture for more than 50% by weight calculated on the total weight of all the elastomers in the mixture, thus excluding all the other non-elastomeric components of the belt.

The body 102 preferably comprises as a first or as a further elastomeric material at least one polyolefin copolymer or a rubber containing acrylonitrile units.

More advantageously the copolymer(s) used as body mixtures are nitrile rubbers, advantageously they are acrylonitrile butadiene rubbers, known by the acronym NBR. Even more advantageously, they are hydrogenated acrylonitrile butadiene or HNBR or even XHNBR, i.e. hydrogenated and carboxylated acrylonitrile butadiene.

For example, use can be made of the so-called fully saturated HNBRs and thus having a residual percentage of double bonds of no more than 0.9%, but alternatively, use can be made of HNBRs with a lower degree of saturation, such as for example HNBRs with a degree of saturation of 4% or 5.5%, so-called partially saturated.

Even more advantageously, in combination with a first elastomeric material use is also made of an elastomeric material formed by a mixture of one or more copolymers, obtained starting from a diene monomer and a monomer containing nitrile groups where one or more of these copolymers are added with an acid or a salt of an unsaturated carboxylic acid. More advantageously the unsaturated carboxylic acid is methacrylic or acrylic acid and said salt is a zinc salt of the methacrylic or acrylic acid. Even more advantageously, a zinc salt of methacrylic acid is used. Even more advantageously, the zinc salt of the methacrylic acid is added in an amount between 10 and 60 phr.

For example, elastomers sold by Zeon under the following names are advantageously used: ZSC 1295, ZSC 2095, ZSC 2195, ZSC 2295, ZSC 2295L, ZSC 2295R and ZSC 2395.

In particular, it is possible to replace part or all of the previously mentioned HNBRs, i.e. ZETPOL and/or THERBAN with a ZSC comprising an unsaturated carboxylic acid and zinc oxide and/or with THERBAN ART comprising an unsaturated carboxylic acid salt.

Mixed mixtures of polyolefins and rubbers containing acrylonitrile units are also preferred, more preferably mixtures containing an ethylene copolymer with NBR or HNBR or the above-mentioned modified HNBRs. For example, rubbers containing EPDM (Ethylene propylene diene monomer) or EPM (Ethylene propylene monomer) can be added to polymers containing acrylonitrile units in an amount preferably between 1 and 30%.

In addition to the elastomeric materials, the body mixture may comprise conventional additives such as, for example, reinforcing agents, fillers, pigments, stearic acid, accelerators, vulcanizing agents, antioxidants, activators, initiators, plasticizers, waxes, pre-vulcanization inhibitors, antidegradants, process oils, and the like.

The cords 103 are formed by a plurality of threads or burrs or yarn and each thread is formed by a plurality of filaments. Preferably, the cords 103 are made of at least one material selected from the group consisting of glass fibres, aramid fibres, carbon fibres, PBO fibres, even more preferably they have at least external glass filaments, as this material has proved to be particularly critical when it is to be used at low temperatures.

Alternatively, the cords may be made of two different materials. Even more preferably at least the external surface of the cords is made of glass fibres.

Advantageously, the working surface of the transmission belt 101 is covered by a covering 108. The covering 108 is most advantageously selected from the group consisting of woven fabric, knitted fabric or non-woven fabric.

The fabric 108 covering the toothing 105 or the optional fabric covering the back 110 may consist of one or more layers and may be obtained by different weaving techniques, for example, by the weaving technique known as 2×2 twill.

The covering fabric 108, 110 has a structure consisting of a weft and a warp.

More advantageously in the case of use of a woven fabric, the covering 108, 110 comprises threads extending substantially in the longitudinal direction of the toothed belt. Generally, such longitudinal threads are the weft threads.

Advantageously, the weft threads comprise at least one elastic thread and at least one thread with high thermal and mechanical resistance, such as for example aliphatic polyamide, aromatic polyamide or aramid, PET, polyesters, but also natural-based fabrics like cotton possibly also in complex or mixed structures with multiple threads of a chemical nature wound one on top of the other.

The elastic thread is used to facilitate the extension of the fabric so as to follow the profile of the teeth during the vulcanization step.

Even more advantageously the weft threads comprise an elastic thread and at least a first and a second thread, more preferably the first and the second thread are polyamides, even more preferably they are made of an aliphatic polyamide such as polyamide 6, 6 and an aromatic polyamide, such as for example a para-polyaramide, like for example shown in patent EP0965271.

In a preferred embodiment both threads winding the elastic thread(s) are made of polyaramide.

In a particularly preferred embodiment of the invention, a transmission belt 101 has proved to be particularly resistant in oil, wherein the working surface is covered by a fabric in which a first thread of polyaramide fibres is wound around an elastic thread in a first direction S and a second thread of polyaramide fibres is wound in the opposite direction Z around the first thread. Advantageously, the weft threads comprise para-polyaramide fibres.

For example, the weft threads can be formed by winding a pair of para-polyamide threads, e.g. Technora threads, around a polyurethane thread.

Advantageously, the warp threads comprise meta-polyaramide fibres.

The use of meta-polyaramide threads has proved to be particularly advantageous as it was surprisingly found to be able to maintain excellent tension values even at high temperatures and in oil mixed with petrol. In particular, Conex threads have proved to be particularly advantageous, even more preferably in 40/2 configuration.

Advantageously, fabrics are used that have weft threads composed of an elastolefin thread on which two para-polyaramide threads are wound with an overall (“tensile”) breaking load of the pre-treatment fabric in the longitudinal direction of the belt between 700 and 1300 N/25 mm, even more advantageously between 900 and 1100 N/25 mm.

Advantageously, fabrics are used that have warp threads composed of a meta-polyaramide thread with an overall elasticity of the fabric in the latitudinal direction of between 600 and 1200 N/25 mm, even more advantageously between 800 and 1000 N/25 mm.

Advantageously, fabrics are used that have a post-treatment weight between 400 and 1000 grams/$m^2$. Even more advantageously between 500 and 700 grams/$m^2$.

The fabric 108, 110 is in fact generally subjected to a first, a second, a third and a fourth treatment.

It is possible to use the treatment of the present invention as the sole treatment for the fabric or to use it as the final treatment of the fabric by reducing the number of treatments to which the fabric is subjected.

Such treatments and, in particular, the treatment according to the present invention have proven to be very advantageous for the belt to be able to have a long durability.

Advantageously one of the treatments of the fabric 108, 110 is with RFL.

Advantageously, the fabric 108, 110 is subsequently also subjected to a treatment based on a rubber, also called cement, preferably a hydrogenated nitrile rubber, for example a Zetpol.

Preferably, the fabric 110 covering the back of the belt is also treated with different treatments. According to a preferred aspect of the invention it is advantageous to treat the back 107 with a treatment similar to the treatment according to the invention that covers the working surface 105.

According to one aspect of the present invention the fabric 108 or the fabric 10 or both fabrics 108, 110 are then contacted and then treated with a treatment comprising polyurethane, PTFE and polycarbodiimide, as previously described for the poly-V belts.

Therefore, the finished belt comprises a fabric treated with a treatment comprising polyurethane, PTFE and polycarbodiimide.

More preferably the treatment further comprises triethylamine.

Even more preferably the treatment further comprises a filler, for example carbon black.

The preferred weight percentages are identical to those previously given for the treatment of the poly-V belts.

Also for the toothed belts the treatment can for example be a Resilon® marketed by PPG-Whitford. In particular, the treatment may be a Resilon 2241.

Preferably the treatment is added in a percentage between 1 and 20%, more preferably between 1 and 10% by weight, even more preferably between 3 and 7% by weight relative to the total weight of the material constituting the treatment.

It has been noted that the treatment allows to obtain an increase in the performance of the toothed belt and, in particular, to reduce the wear thereof and therefore to increase the durability at high load.

From an examination of the characteristics of the belt made according to the present invention, the advantages that it allows obtaining are evident.

Considerable improvements have been obtained by using a transmission belt, both a poly-V and toothed one, according to the present invention and, in particular, the problems set out above have been overcome. In particular, the use of a fabric 9, 10, 108, 110 treated with the treatment of the present invention makes it possible to obtain belts with greater durability even when they are subjected to a high load.

The invention will now be described by means of examples without being limited by them.

Example 1 and Comparative Example 2

Two poly-V-belts are moulded with an EPDM body, and 4 ribs are covered with a fabric with two different treatments.

The cord is made of aramid.

The fabric is preferably a warp knitted fabric with PA66 and PU threads in the weft and PA66 in the warp.

In the belt of example 1 according to the invention the fabric is treated with a Resilon 2241 comprising polyurethane, PTFE, polycarbodiimide, triethylamine and carbon black in the following percentages: polycarbodiimide 1-5% by weight; carbon black 1-5% by weight; triethylamine<1% by weight, reaction mass of 5-chloro-2-methyl-2H-isothiazol-3-one and 2-methyl-2H-isothiazol-3-one (3:1)<0.06%; methylisothiazol-3 (2H)-one<0.01%; Polyurethane, PTFE, Water up to 100% by weight.

The solid component is equal to 42.93%, of which the sum of PTFE+PU is about 37.93%. The liquid component is equal to 57.07% of which about 56% by weight water that is lost after the belt vulcanization step.

The dry matter is 5%, the pick-up 20 g/sq·m.

In the belt of comparative example 2 the fabric is treated with the common and well-known RFL treatment.

All other elements being equal, only the treatment of the covering material changes.

The % composition of the solid phase of the RFL is: vinylpyridine latex 74.96%, Resin 11.92%, NaOH 0.95%, formaldehyde 1.72%, carbon black up to 100%.

The raw fabric identical to the previous example is treated with RFL diluted to 5% dry matter and the pick-up is 20 g/sq·m.

Figure 4:
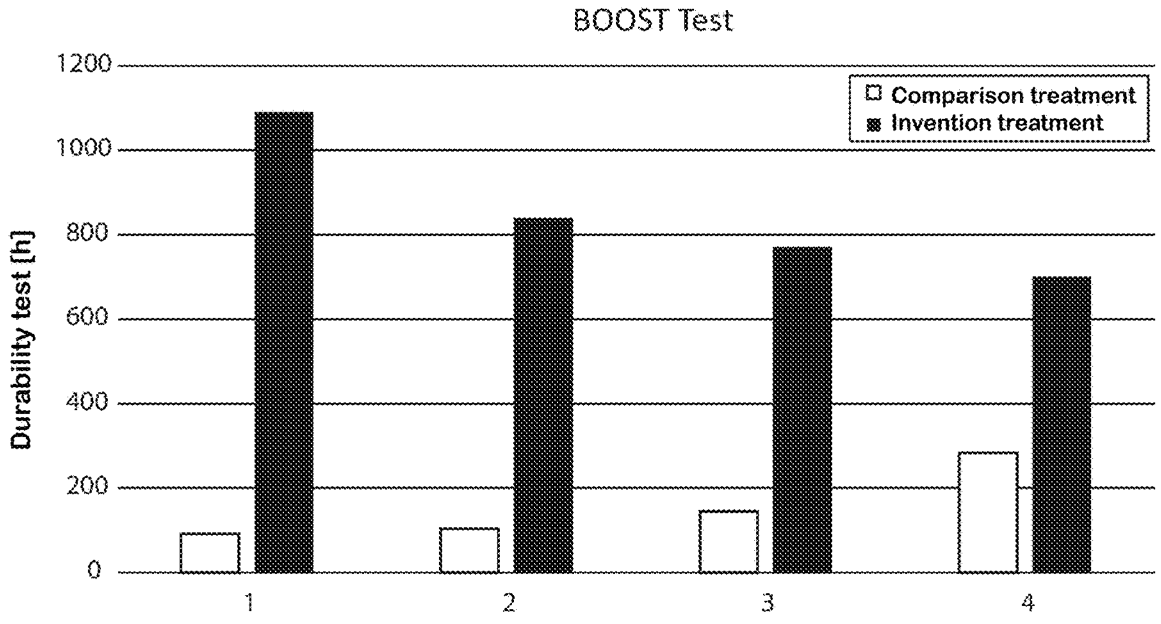
FIG. 4 is a graph showing the results of a durability test also called boost test.

The specifications for the durability test, also called boost test, are shown in Table 1 and the transmission system is shown in FIG. 4.

TABLE 1

| | |
|---|---|
| Belt length | 1200 mm |
| Box Temperature | 30° C. |
| Speed of the drive pulley | 3200 rpm |
| Power | 18.4 KW |
| Driving torque | 55 Nm |
| Loose belt tension | 400N |
| D1 (drive) | 60 mm |
| D2 (idler) | 60 mm |
| D3 (driven) | 120 mm |
| D4 (back idler) | 60 mm (flat) |
| The "tight span" tension | 340N/rib |

The belt temperature during the test reaches: 90° C. rib side, 70° C. on the back, 80° C. (average).

The text is repeated for the number of samples shown on the X axis.

As can be seen from the test of FIG. 4, the belt according to the invention has a longer durability in hours when subjected to a high load durability test than the comparison belt.

The invention claimed is:

1. A power transmission belt comprising:

a body made of a first elastomeric material, a plurality of cords embedded in the belt body, a back and a plurality of ribs or teeth, said back or said ribs or teeth being covered by a covering material selected from the group consisting of woven fabric, knitted fabric, and non-woven fabric, characterized in that said covering material comprises a treatment comprising polyurethane, polytetrafluoroethylene, polycarbodiimide, and a triethylamine.

2. The power transmission belt according to claim 1, wherein said polycarbodiimide is present in an amount by weight relative to the total weight of the treatment of between 0.1 and 20% calculated on the power transmission belt.

3. The power transmission belt according to claim 1, wherein the sum of said polytetrafluoroethylene and said polyurethane is an amount between 0.1 and 88% by weight of the treatment calculated on the power transmission belt.

4. The power transmission belt according to claim 1, wherein said covering material is a woven fabric.

5. The power transmission belt according to claim 1, wherein said belt is a toothed belt.

6. The power transmission belt according to claim 4, wherein said woven fabric comprises an elastic thread and at least one thread having high thermal and mechanical resistance.

7. The power transmission belt according to claim 6, wherein the thread having high thermal and mechanical resistance is an aromatic polyamide.

8. The power transmission belt according to claim 1, wherein said belt is a poly-V belt.

9. The power transmission belt according to claim 8, wherein said covering material is a knitted fabric.

10. The power transmission belt according to claim 9, wherein said knitted fabric is a warp knitted structure.

11. The power transmission belt according to claim 9, wherein said knitted fabric comprises a polyamide yarn.

12. The power transmission belt according to claim 9, wherein said knitted fabric comprises at least one polyamide yarn and one polyester or cotton yarn.

13. A power transmission system of a motor vehicle comprising a belt according to claim 1.

14. A process for manufacturing a power transmission belt comprising a body made of a first elastomeric material, a plurality of cords embedded in the belt body, a back and a plurality of ribs or teeth, said back or said ribs or teeth being covered with a covering material selected from the group consisting of woven fabric, knitted fabric, and non-woven fabric, wherein the method comprises:

treating said covering material with a treatment comprising polyurethane, polytetrafluoroethylene, polycarbodiimide, and a triethylamine.

15. The process of claim 14, further comprising vulcanizing the power transmission belt after treating said covering material.

16. The process of claim 14, wherein treating said covering material comprises adding an aqueous composition comprising the polyurethane, polytetrafluoroethylene and polycarbodiimide to the covering material.

17. The process of claim 16, wherein the covering material has a pick-up of the treatment into the fabric in a range of 2 and 80 $g/m^2$.

18. A process for manufacturing a power transmission belt comprising:

a body made of a first elastomeric material, a plurality of cords embedded in the belt body, and a back and a plurality of ribs or teeth, said back or said ribs or teeth being covered with a covering material selected from the group consisting of woven fabric, knitted fabric, and non-woven fabric, wherein the method comprises:

treating said covering material with a treatment comprising polyurethane, polytetrafluoroethylene, and polycarbodiimide; and vulcanizing the power transmission belt after treating said covering material.

* * * * *